United States Patent [19]

Yoshifumi

[11] 3,731,115

[45] May 1, 1973

[54] VOLTAGE MEMORY CIRCUIT

[75] Inventor: Saeki Yoshifumi, Tokyo, Japan

[73] Assignee: Pioneer Electronic Corporation, Ohta-Ku, Tokyo, Japan

[22] Filed: Mar. 10, 1971

[21] Appl. No.: 122,869

[30] Foreign Application Priority Data

Mar. 10, 1970 Japan ................................45/19684

[52] U.S. Cl. ...................307/238, 307/235, 328/151

[51] Int. Cl. ...........................G11c 11/34, H03k 5/00

[58] Field of Search..............................307/235, 238; 328/151, 173, 175

[56] References Cited

UNITED STATES PATENTS 3,248,655 4/1966 Kobbe et al. .....................328/151 X 3,355,719 11/1967 Fox.................................328/151 X

*Primary Examiner*—John Zazworsky

*Attorney*—Sughrue, Rothwell, Mion, Zinn & Macpeak

[57] ABSTRACT

A circuit having a condenser, the charging voltage for said condenser being selected by an instruction signal, and after being selected, the selected charging voltage is constantly checked and automatically held.

3 Claims, 3 Drawing Figures

INVENTOR.
YOSHIFUMI SAEKI
BY Sughrue, Rothwell, Mion, Zinn & Macpeak
ATTORNEYS

VOLTAGE MEMORY CIRCUIT

BACKGROUND OF THE INVENTION

This invention relates generally to a voltage memory circuit, and more particularly to a circuit in which the level of the potential stored in the condenser can be initially selected and then automatically constantly checked so as to hold the selected voltage value.

In the prior art, controlling circuits which utilize the voltage stored in a condenser to control another circuit cannot be stable for a long time in its operation. For example, when a condenser, which is previously charged to a certain voltage is connected between a base and an emitter of a transistor so as to keep a collector current constant, the charge on the condenser is gradually discharged through the base circuit. For this reason, the base voltage becomes lower and lower and the collector current can be kept constant for only a little while.

There has been proposed, as an improvement of the prior circuit, a circuit in which a field effect transistor (FET) is used in place of the transistor because the DC input impedance of the FET is extremely high. But it is impossible to keep the voltage on the condenser constant for a long time because of the condenser leakage current.

SUMMARY OF THE INVENTION

It is the main object of the present invention to provide a novel and improved voltage memory circuit in which the level of the voltage stored in a condenser can be selected at any value and then automatically constantly checked so as to hold this voltage value.

DESCRIPTION OF THE PREFERRED EMBODIMENT

Figure 1:
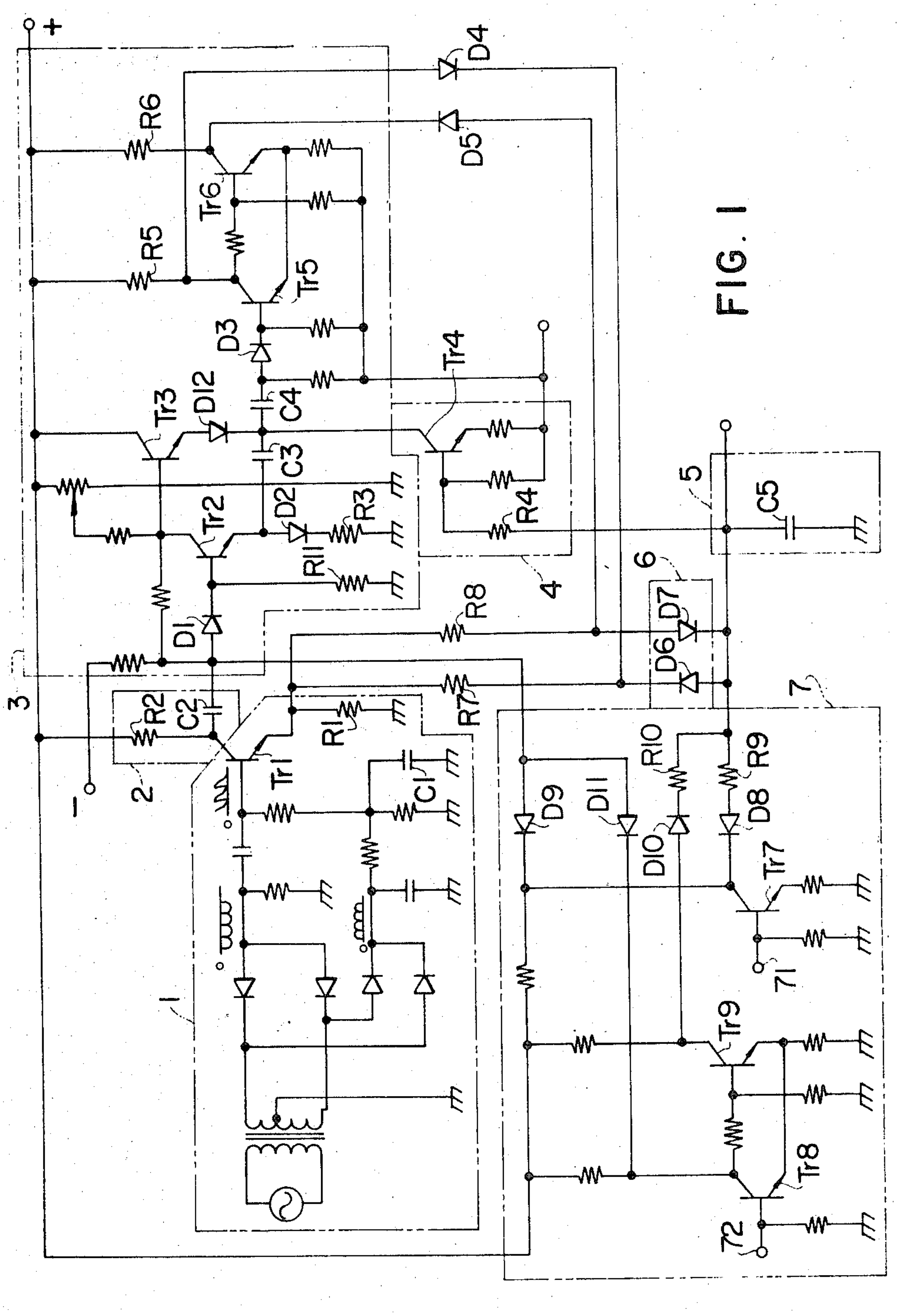
FIG. 1 shows a circuit of one embodiment of the present invention.

Referring to FIG. 1, a saw tooth oscillator 1 oscillates a saw tooth wave signal by which a trigger circuit 2 is operated so as to generate a trigger pulse signal. Receiving a trigger pulse coming from the trigger circuit 2, is a pulse generating circuit 3 which generates a pulse signal after a certain timer period. The timer period of the pulse generating circuit 3 is decided by a timing circuit 4 which is controlled by voltage stored in a memory circuit 5. A gate circuit 6 is connected between the saw tooth oscillator 1 and the memory circuit 5, and opens its gate only while the pulse generating circuit 3 is generating pulse signals. The value of the voltage stored in the memory circuit 5 is varied by a voltage varying circuit 7 which is controlled by an instruction signal coming from another circuit not shown.

An explanation of the operation of the circuit just described will now be given in detail. A saw tooth wave appearing at the collector of transistor T*r*1 of the saw tooth oscillator 1 is re-formed into a trigger pulse by a resistor R2 and a condenser C2 which comprise the trigger circuit 2, the trigger pulse is fed to the base of transistor T*r*2 of the pulse generating circuit 3 through diode D1.

The diode D1 is usually reverse biased so that it is held in OFF state. Therefore, transistor T*r*2 is in an OFF state and transistor T*r*3 in ON state. When a trigger pulse is fed to the base of transistor T*r*2, the transistor T*r*2 turns ON which causes the base potential of transistor T*r*3 to fall. Diode D12 is reverse biased by the charge on condenser C3 which is previously charged up. When diode D12 is non-conductive, condenser C3 is discharged through a circuit formed by the emitter of transistor T*r*2, the condenser C3 and the collector of transistor T*r*4.

The timing circuit 4 is a kind of a constant-current circuit and the collector current of the transistor T*r*4 is determined by its base voltage, that is, by the voltage of the memory circuit 5. That is to say, the value of the discharging current of the condenser C3 is determined by the value of the base bias voltage of transistor T*r*4. After condenser C3 is discharging for a certain period, transistor T*r*2 is returned to its OFF state while transistor T*r*3 is returned to its ON state. Then, condenser C3 is quickly charged again through a circuit formed by transistor T*r*3, diode D12, condenser C3, a diode D2 and a resistor R3. On the other hand, while transistor T*r*2 in ON, diode D1 is reverse biased by the base bias voltage of transistor T*r*2 which is caused by a resistor R11. As a result, the trigger pulse from the trigger circuit 2 is not fed to the base of the transistor T*r*2 until the transistor T*r*2 is turned to OFF state again. After the transistor T*r*2 is turned OFF, the circuit operation described above is repeated again on the occurrence of the next trigger pulse.

After the delay time, when transistor T*r*3 is turned ON again, a pulse signal is fed to the base of transistor T*r*5 by and through a condenser C4 and diode D3 which causes the transistor to turn ON and transistor T*r*6 to turn OFF. When the transistor T*r*5 is OFF and T*r*6 is ON, the current, running through a resistor R5, diode D4, resistors R7 and R8, diode D5 and transistor T*r*6, reverse biases diodes D6 and D7 of gate circuit 6 which causes them to be turned OFF. When transistor T*r*5 turns ON and the transistor T*r*6 turns to OFF, diodes D4 and D5 are reverse biased and turn OFF, causing condenser C5 of the memory circuit 5 to discharge through diode D6 or charged through a diode D7 so as to store a potential equal to the emitter potential of transistor T*r*1.

Figure 2:
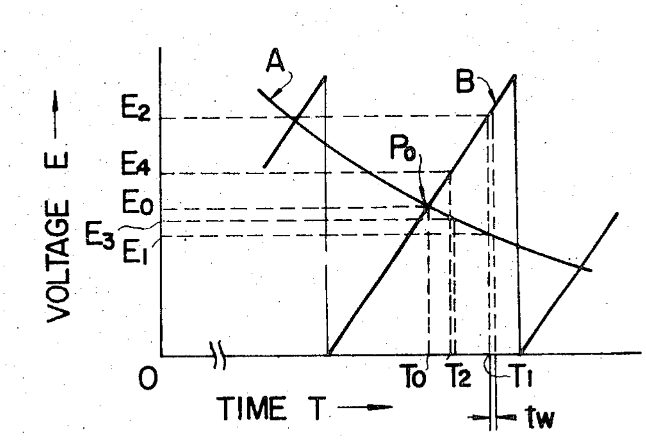
FIG. 2 shows a graph to use for the explanation of the operation of the circuit shown in FIG. 1.
Figure 3:
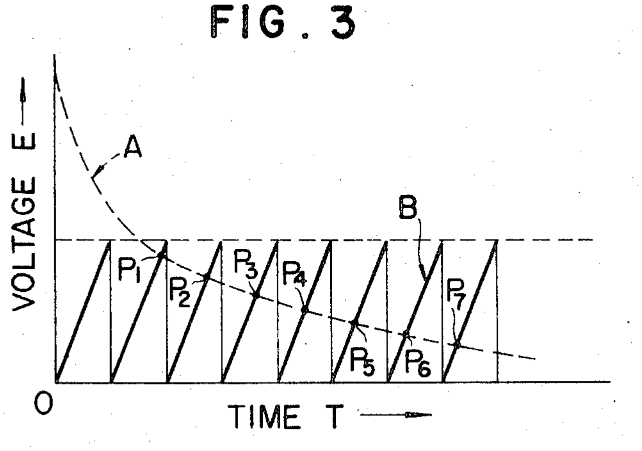
FIG. 3 shows a graph to use for the further explanation of the operation of the circuit shown in FIG. 1.

The timing relationship between the opening of gate circuit 6 and the output voltages from the memory circuit 5 and the saw tooth oscillator 1 will be explained with FIG. 2. When the voltage $E_1$ is added to the condenser C5 by a voltage varying circuit 7, the current value of the timing circuit 4 is decided by the voltage $E_1$, whereby the time $T_1$ at which a pulse signal is sent out from the pulse generating circuit 3, that is, when the gate circuit 6 opens its gate is decided. The gate circuit 6 opens its gate only for the time $tw$ in every cycle of the saw tooth wave. The emitter voltage of the transistor T*r*1 becomes $E_2$ at the time $T_1$. Therefore the condenser C5 is charged to the voltage $E_3$ through the diode D7 which causes the value of the timing circuit 4 to rise, and the transistor T*r*3 can be returned to its ON state earlier than before. Consequently, the pulse generating circuit 3 generates a pulse signal of duration

*tw*, at the time $T_2$ which is earlier than before, causing the gate circuit 6 to open. The emitter voltage of transistor T*r*1 becomes $E_4$ at the time $T_2$. The condenser C5 is further charged again to the voltage $E_4$ through the diode D7. Thus, the voltage of the condenser C5 draws nearer and nearer to the voltage E*o*. When the voltage of the condenser C5 is E*o*, the time at which the pulse generating circuit 3 generates a pulse is T*o*. That is, at the time T*o*, the gate circuit 6 opens its gate and the voltage at the emitter of transistor T*r*1 is E*o*. If the voltage of the condenser C5 is shifted up or down, the voltage is quickly brought back to E*o* and the voltage E*o* is always kept constant.

Thus, if the condenser C5 is charged, at first, to a certain voltage, for example $E_1$, the voltage of the condenser C5 is stabilized at the cross point P*o* (T*o*, E*o*) whereat the charging and discharging characteristic curve A of the condenser C5 crosses the saw tooth wave form of the signal B appearing at the emitter of the transistor T*r*1. The voltage E*o* is checked and kept constant. If a voltage E*a* is fed to condenser C5, the voltage across condenser C5 draws nearer and nearer to the cross point E*a* which is the nearest point of all stabilized points $P_1$, $P_2$, $P_3$, - - - P*n*. That is, there are *n* stable points in number.

In case the stabilized voltage of condenser C5 is changed, the circuit operation will be explained hereinafter. If a positive signal is fed to an input terminal 71 of the voltage varying circuit 7, transistor T*r*7 turns ON and the condenser C5 is discharged by and through a diode D8 and resistor R9. During this discharging period, the operation of the pulse generating circuit 3 must be stopped so as to prevent the condenser C5 from being charged again. When transistor T*r*7 is turned ON, a diode D9 is forward biased which causes the output signal of the trigger circuit 2 to attenuate largely. Consequently, the pulse generating circuit 3 cannot generate any pulses. After the input signal of the input terminal 71 has stopped, the voltage of the condenser C5 is stabilized at its new point and kept constant until the next charging operation.

If a positive signal is fed to input terminal 72 of the voltage varying circuit 7, transistor T*r*8 turns ON and diode $D_{11}$ is forward biased which causes the output signal of the trigger circuit 2 to attenuate largely. Consequently, the pulse generating circuit 3 can not generate any pulses. A transistor T*r*9 turns OFF simultaneously with the operation of the transistor T*r*8 turning to ON state, and the condenser C5 is charged by and through a diode D10 and a resistor R10.

According to the present invention, as described hereinabove, the level of the voltage stored in the memory circuit 5 can be selected by an instruction signal, and after being selected, the selected voltage is constantly checked and held automatically. The memorized voltage in the memory circuit 5 can be utilized in various remote controlling operations, as for example, a volume control, a tone control or a dialing control in a receiver.

Although the invention has been described with respect to the preferred embodiments thereof, it is understood by those skilled in the art that various modifications can be made in construction and arrangement within the scope of the invention as defined in the appended claims.

What is claimed is:

1. A voltage memory circuit, comprising;
   a. a saw tooth oscillator,
   b. a trigger circuit for generating a trigger pulse in response to receiving a saw tooth signal from said saw tooth oscillator,
   c. a pulse generating circuit for generating a pulse signal after a predetermined time initiated by receipt of a trigger pulse from said trigger circuit,
   d. a timing circuit for controlling said predetermined time period,
   e. a voltage storing memory circuit for controlling said timing circuit,
   f. a gate circuit, connected between said saw tooth oscillator and said memory circuit, said gate circuit being open only while said pulse generating circuit is generating pulse signals,
   g. a voltage varying circuit, responsive to an instruction signal, for varying the level of the voltage stored in said memory circuit.

2. A voltage memory circuit as set forth in claim 1, wherein the memory circuit consists of a condenser.

3. A voltage memory circuit as set forth in claim 1 wherein said pulse generating circuit includes means responsive to the generation of pulse signals for opening said gate circuit.

* * * * *